April 23, 1940.   A. BENSON   2,198,471

VARIABLE SPEED TRANSMISSION

Filed April 6, 1939   2 Sheets-Sheet 1

INVENTOR
Andrew Benson
BY Fred Bing
ATTORNEY

April 23, 1940. A. BENSON 2,198,471
VARIABLE SPEED TRANSMISSION
Filed April 6, 1939 2 Sheets-Sheet 2
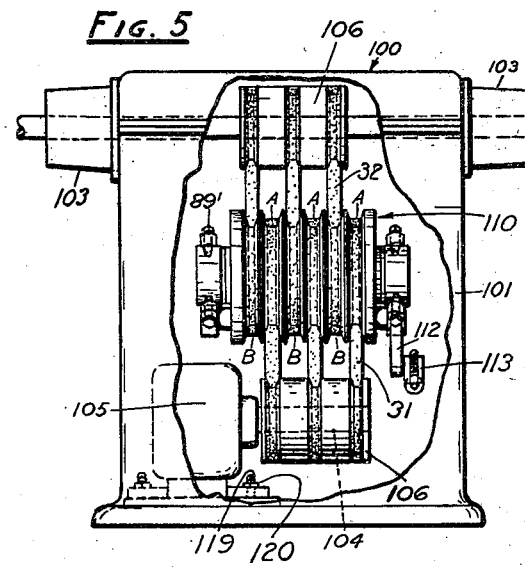
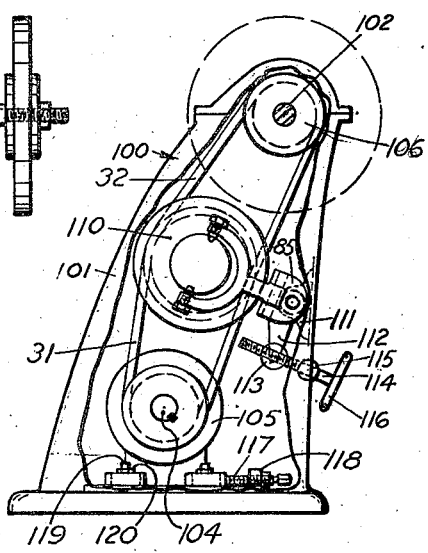
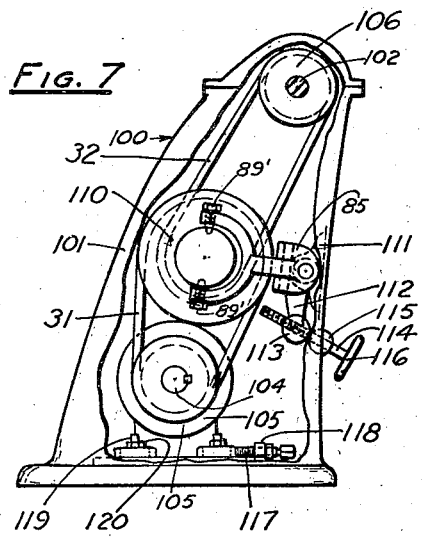
INVENTOR
Andrew Benson
By Ferd Bing
ATTORNEY Patented Apr. 23, 1940

2,198,471

UNITED STATES PATENT OFFICE 2,198,471

VARIABLE SPEED TRANSMISSION

Andrew Benson, Wilmette, Ill.

Application April 6, 1939, Serial No. 266,334

3 Claims. (Cl. 74—230.17)

The invention relates generally to variable speed power transmissions, and more particularly to such devices wherein the power transmission path comprises a plurality of V-belts acting in parallel so that each V-belt transmits but a portion of the total transmitted power.

The primary object of the present invention is to provide such a multiple V-belt variable speed transmission which is compact, economical and simple in construction, and which is simple and effective in its operation.

A more specific object of the present invention is to provide such a multiple V-belt variable speed transmission wherein all of the ratio-varying pulleys are carried upon a single intermediate or transmission shaft in such a manner as to attain compactness as well as simplicity and economy of construction.

A further object is to provide such a multiple V-belt variable speed transmission wherein endwise actuation of the ratio-varying elements or coned disks of the speed-varying pulleys is automatically attained without direct mechanical actuation of such pulleys, and in such a manner as to absorb all end thrust within the rotating portions of the pulley unit.

Another object is to provide such a multiple V-belt variable speed transmission wherein the speed-varying pulleys are so mounted and related as to assure automatic attainment of perfect alinement of the belts and pulleys at all times.

Another object is to provide a multiple V-belt variable speed transmission which is particularly adapted for use as built-in equipment in machines such as polishing lathes and the like to transmit within the limited available space the large power requirements of such machines.

Another object is to provide such a multiple V-belt variable speed transmission wherein a single assembly unit including the intermediate shaft and its mounting is so constructed as to embody not only the speed-varying means but also a means operable to maintain perfect pulley and belt alinement even though this assembly unit is utilized between conventionally mounted V-pulleys on the input and output shafts.

Other objects and advantages will become apparent from the following description taken in connection with the accompanying drawings, in which:

Fig. 5 is a rear elevational view of a polishing lathe embodying a drive constructed in accordance with the invention, the wall of the column being broken away to show details of internal construction.

Fig. 6 is an end view of the lathe of Fig. 5, the wall of the column being broken away.

Fig. 7 is a view similar to Fig. 6 showing the drive adjusted to a lower speed ratio.

Figures 3, 4:
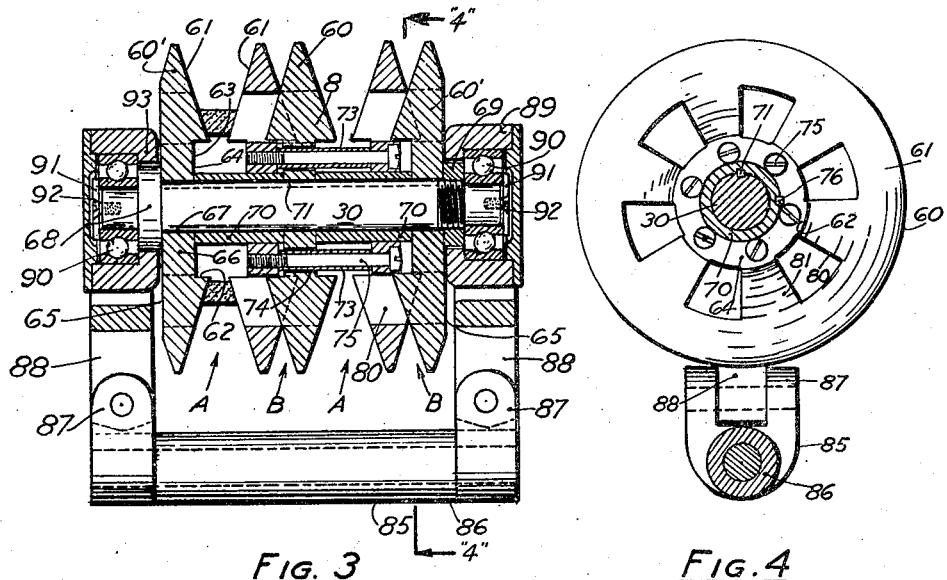
Fig. 3 is a central sectional view of the speed-varying pulley assembly.
Fig. 4 is a transverse sectional view taken along the line 4—4 of Fig. 3.

For purposes of disclosure I have illustrated in Figs. 1 to 4 of the drawings the embodiment of the invention in a self-contained unit 10 adapted to be interposed in accordance with known practice between a power source and a power consuming apparatus. The variable speed unit 10 as herein shown comprises a hollow casing 11, having a base section 12 and a cover section 13, separable along the line 14, and secured together by screws 15 acting between flanges 16 along the meeting edges of the two sections 12 and 13. Adjacent to opposite ends of the casing two parallel transverse shafts 20 and 21 are mounted by means of conventional removable ball bearings 22 positioned in suitable sockets formed along the line of separation of the base section 12 and the cover section 13. One end of each shaft projects from the casing, and if desired, both ends of each shaft may so project through screw-fastened cover rings 23, so that a suitable source of driving power may be connected to one of the shafts, while a suitable power take-off connection may be made with the other one of the shafts. For purposes of the present description the shaft 20 will be considered as the driving shaft, and the shaft 21 as the driven shaft.

In producing such a compact and efficient variable speed transmission of large capacity the present invention utilizes but a single intermediate or transmission shaft 30 between the driving shaft 20 and the driven shaft 21, the shaft 20 serving through the parallel and equalized power transmitting action of a plurality of small sized V-belts 31 to transmit rotation to the intermediate shaft 30, while a plurality of similar V-belts 32 act to transmit such rotation from the intermediate shaft 30 to the driven shaft 21.

Figures 1, 2:
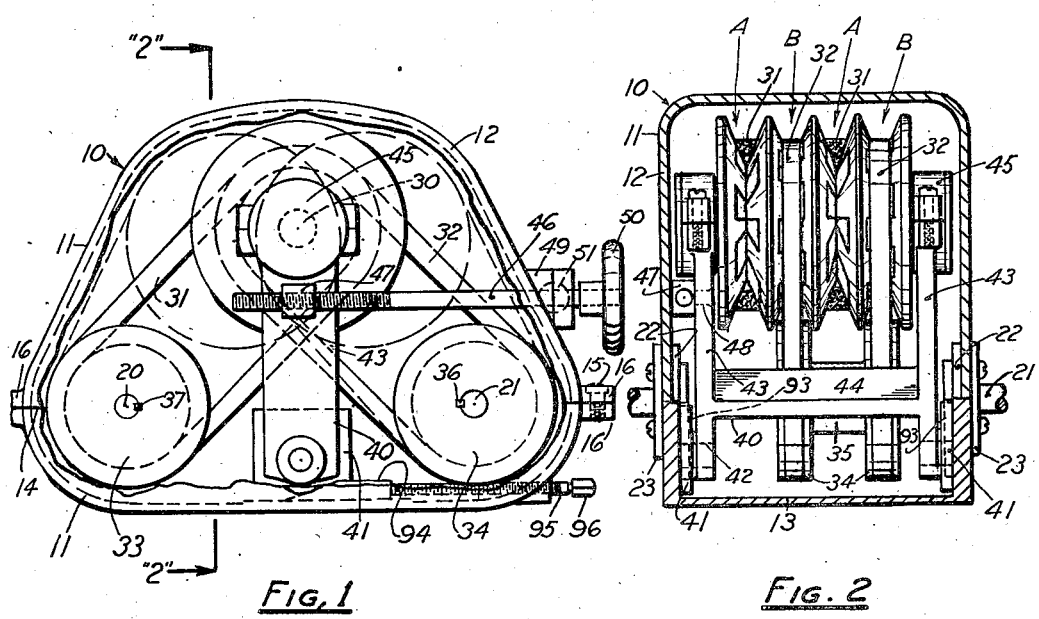
Fig. 1 is an end elevational view of a self-contained variable speed unit embodying the features of the invention, a portion of the casing being broken away to show the interior construction.
Fig. 2 is a transverse sectional view taken along the line 2—2 of Fig. 1.

As shown in Fig. 2, the group of power input belts 31 and the group of power output belts 32 are so spaced and arranged that the input and output belts extend about the intermediate shaft 30 in alternating relation.

The belts 31 are driven from the shaft 20 by means of similar V-pulleys 33, while similar V-pulleys 34 transmit the power from the output belts 32 to the driven shaft 21. The pulleys 34 are preferably formed integrally with a mounting sleeve 35 (Fig. 2) and are keyed to the shaft 21 as indicated at 36. The pulleys 33 may be similarly formed, and are keyed to the shaft 20 as at 37.

To transmit power between the driving shaft 20 and the driven shaft 21 at variable ratios, the present invention contemplates and provides simple, economical and effective means whereby conventional V-belts of relatively small size may be employed even though the total power transmission requirements are far in excess of the individual capacity of each V-belt. Through the provision of such means the pulley diameters may be maintained at the minimum, thereby to render the unit extremely compact in a plane perpendicular to the driving and driven shafts; while the extreme simplicity and automatic adjustment of the variable pulleys of the present device render the mechanism compact in the direction of the shaft axes.

This highly desirable feature of compactness is of vital importance in power transmission units of relatively large capacity, say 5 H. P. and up, since the minimum pulley diameter for large capacity V-belts increases in a disproportionate and burdensome ratio to the increase in horse power. Moreover, such larger sizes of V-belts ordinarily require slower speeds in order to avoid disruption of the frictional driving relation by the action of centrifugal force.

The power input from the group of V-belts 31 is transmitted to the group of power output belts 32 at varying transmission or speed ratios through a ratio-varying pulley assembly of extremely simple yet effective construction carried on the intermediate shaft 30. To this end the intermediate shaft 30 carries a plurality of variable-diameter power input V-pulleys A, each engaged by one of the power input belts 31, and a plurality of variable-diameter power output V-pulleys B alternately related to the pulleys A and each engaged by one of the output belts 32. These pulleys A and B are so constructed, as will hereinafter be explained, that when their supporting shaft 30 is moved away from the drive shaft 20 (and generally toward the shaft 21), the effective diameter of the pulleys A is reduced, while the effective diameter of the pulleys B is increased, thereby to increase the speed of the driven shaft 21 with relation to the driving shaft 20; and reversal of this movement of the shaft produces a decrease in the transmission ratio.

To provide for such shifting movement the shaft 30 may be mounted on various types of slide or rocking carriers, such, for example, as the rocking carrier 40 shown in Figs. 1 and 2. The carrier 40 is supported on base elements 41 mounted in the base section 12 intermediate the ends thereof, the carrier 40 being supported on pivot pins 42 for rocking movement about an axis parallel to the shafts 20 and 21. From the pivots 42 the carrier 40 has two upwardly projecting arms 43 rigidly connected by a cross bar 44. At their upper ends the arms 43 have separable bearing pockets 45 which enclose suitable anti-friction bearings to support opposite ends of the shaft 30. Along the outer side of one of the arms 43 a screw threaded adjusting shaft 46 extends in a generally horizontal direction into engagement with a nut 47 pivoted on a horizontal axis 48 on the arm 43. This shaft 46 extends through a housing 49 at one end of the cover section 13 of the casing and has a hand wheel 50 on its projecting end. Within the housing 49 a ball-shaped abutment 51 is fixed on the screw shaft 46 so as to hold the shaft against longitudinal displacement while allowing slight lateral rocking of the shaft 46 as its inner end is shifted up and down by rocking movement of the carrier 40. Thus by actuation of the hand wheel 50 the carrier 40 may be rocked back and forth.

In accordance with the present invention the several input and output V-pulleys A and B are formed by a plurality of centrally bored coned disks 60 mounted in axially alined relation on the shaft 30. The disks 60 are generally similar in form, the end disks 60' being coned on their inner or adjacent faces only, while the intermediate disks 60 may be said to be of "double coned" form, being similarly coned on both faces. Thus each end disk 60' has its inner face formed with a conical surface 61 disposed at the usual side angle employed in V-belt drives, this conical face 61 extending throughout the outer annular portion of the face of the disk, and terminating at a counterbore 62 (Fig. 3). This counterbore 62 defines a clearance space 63 radially inwardly of the inner portion of the coned driving face 61, and between the inner or bottom face 64 of the counterbore 62 and the other face 65 of the disk 60', there is provided a relatively thick mounting portion or flange 66. The mounting portion 66 has its axial bore 67 sized to fit snugly about the shaft 30 and against a clamping means such as an annular shoulder 68 at one end of the shaft 30 or a clamping nut 69 at the other end thereof.

As above pointed out, the intermediate disks 60 are of double coned form, and each face has a coned surface 61 and a counterbore 62 similar to the inner faces of the end disks and symmetrically disposed on opposite sides of a central plane. It will be observed that there is an odd number of disks 60 and 60', and that one end disk and alternate disks counting therefrom are fixed in predetermined equally spaced relation to each other to form a first unit, while the other disks are fixed in the same equally spaced relation to each other to form a second unit which is shiftable longitudinally relative to the first unit. In attaining such a rigid and fixed mounting of the first unit as above defined on the shaft 30 the central bores of the component disks fit snugly on the shaft, and between these disks spacing sleeves 70 are positioned. All of these disks as well as the sleeves 70 are keyed to the shaft 30 as indicated at 71, and the disks are clamped in rigid relation by tightening of the clamping nut 69.

The disks 60 of the second or slidable unit as above defined have their central bores 67 sized to slidably embrace the sleeves 70, and these disks 60 are fixed in the desired spaced relation by a plurality of spacing tubes 73 extending loosely through bores 74 in the mounting portion 66 of the intermediate disk or disks 60 of the first unit, there being clamping bolts 75 extending through the spacing tubes 73 to clamp the component disks against the spacing tubes. In the present case the bolts 75 have their heads countersunk in the mounting portion 66 of one disk 60, and their threaded ends screwed into the other component disk. The central bores 67 of the disks of the second or sliding disk unit are slidably keyed to the sleeves 70 by keys 76 as shown in Fig. 4; and the bores 67 and the exterior surfaces of the sleeves 70 are accurately finished to provide a tight sliding fit therebetween. Such relative tightness of the sliding fit may be varied considerable but should be kept as tight as possible in order that lateral rigidity of the disks may be assured. In this connection it should be noted that the lateral shifting force exerted by the rapidly running belts is extremely great, so that efficient shifting of the second unit takes place even when the second unit is so tightly fitted as to render manual shifting practically impossible.

To provide a wide range of variation in the effective diameter of the pulleys A and B, the radial extent of the coned surfaces must be quite large, and hence provision is made for intermeshing the innermost portions of adjacent coned surfaces when such surfaces are moved toward each other. Thus each disk 60 and 60' has a plurality of radially extending cut-out portions 80 formed in the inner portions of the coned surfaces, these cut-out portions 80 being equally spaced circumferentially, and defining intermediate spoke-like portions 81 of slightly less width than the cut-out portions or clearance spaces 80. The clearance spaces 80 terminate short of the outer edge of the disks, and preferably extend slightly into the mounting portion 66 (Figs. 3 and 4) so as to assure clearance for the radial spoke-like portions 81.

Thus it will be evident that when the carrier 40 is rocked so as to shift the intermediate shaft 30, the belts on one side of the shaft 30 will be tightened so as to be drawn radially inwardly of their variable diameter pulleys A or B as the case may be. Assuming an adjustment in the case of the Fig. 3 positioning of the pulleys which tends to draw the power output belts 32 radially inwardly in their power output pulleys, it will be evident that an endwise actuation will be applied to the second or shiftable unit toward the left. This will result in forcing the power input belts 31 radially outwardly. Such an action takes place relatively easily at the high speed of rotation employed in devices of this character; and it will be evident that the shiftable unit of the speed varying assembly will automatically move with a floating action to a position of equilibrium wherein the stresses on the belts are effectually equalized.

With the present construction wherein the lateral disk-shifting forces are applied to the disks through the belts it will be evident that these forces endwise of the speed varying unit are absorbed or counter-acted within the confines of the disk assembly, so that no end-thrust bearings are required for their mounting shaft 30. Also, it should be observed that with V-belt drives it is of primary importance that the disks or driving faces be held against wobbling, and that the forces tending to produce such wobbling are particularly effective where the lateral forces are applied by input and output belts on opposite sides of a disk act as a force couple both tending to produce rocking in the same direction. With the speed varying unit constructed in accordance with the present invention this tendency to produce such wobbling of the disks is effectually counter-acted so as to assure true running of the disks at all times. Thus it will be noted that the second or slidable unit has slidable bearings on the sleeves 70 which are spaced a considerable distance apart longitudinally, and since the disks of this slidable unit are held rigidly together by their spacing tubes 73 and clamping bolts 75, the disks of the sliding unit are effectually maintained in the desired perpendicular non-wobbling relation to the axis of the shaft 30.

It will be evident that in the variation of the relative diameters of the pulleys A and B, the belts 31 and 32 will be laterally shifted along or in relation to the shaft 30 in an amount equal to one-half the shifting movement of the shiftable disks 60, and provision is made to compensate for such shifting and re-establish a true plane of belt movement for each belt. In the form shown in Figs. 1 and 2, wherein the shaft 30 is supported in fixed endwise position by the rigid carrier arms 43, this compensation is effected by mounting the pulleys 33 and 34 for limited axial shifting movement on this supporting shafts. In the form shown in Figs. 3 and 4, axially fixed driving and driven pulleys may be employed, and the intermediate shaft 30 is supported for axial floating movement. To provide for such movement a sliding mounting may be employed, or as in Figs. 3 and 4, a mounting in the nature of a pantograph may be used. This mounting comprises a rocking base 85 having a bearing sleeve 86 at the ends of which transverse hinge bearings 87 are provided. In the hinge bearings 87 a pair of supporting arms 88 are pivoted, the forked upper ends of which are operatively associated with bearing collars 89, and within the collars 89 anti-friction bearings 90 are mounted to support the ends of the shaft 30. To provide for rocking of the bearing collars 89 on axes parallel to the hinge bearings 87, alined screw trunnions 89' are projected through opposite sides of the forks into suitable sockets in the bearing collars. This construction is illustrated in detail in Figs. 6 and 7, and the same construction is used with the embodiment of Figs. 3 and 4. In Figs. 3 and 4, a fastening washer 91 and screw 92 at each end of the shaft 30 secures the bearings 90 to the shaft, and an inturned flange 93 on the bearing collar acts to hold the arms 88 in assembled relation to the shaft. With this construction the shaft 30 floats to the proper alined position as the speed-varying adjustment progresses. The pantograph mounting of Figs. 3 and 4 may, of course, be substituted in the self-contained unit 10, in which case the driving and driven pulleys are fixed on their shafts 20 and 21.

As shown in Figs. 1 and 2, provision is made for tightening the input and output belts, this end being attained by mounting the base elements 41 on vertical slides or ways 93 and providing a tapered cam plate 94 beneath the base elements 41 for raising the same as required to tighten the belts. In the present instance the cam plate 94 is actuated by a screw 95 the squared end 96 of which projects from one end of the base section 12.

In producing endwise compactness of the speed varying pulley unit, and in making the second or slidable unit proof against lateral wobbling of its disks, the undercut or counter bored form of the disks is a primary and vital factor in the present invention, for it will be evident that by this construction annularly continuous mounting flanges or portions 66 are formed between the counter bores 62 of each disk, and that these unbroken flanges 66 provide the proper rigid connection with the several spacing tubes 73, and clamping bolts 75. Hence the rigidly related unit formed by the several disks has widely spaced sliding bearing points, and the several disks of the sliding unit cooperate in preventing wobbling of all of the other disks of the sliding unit. With the input and output groups of belts extending in generally opposite directions from the shaft 30, it is to be noted that the alternate arrangement of the belts of the two groups is an important feature in balancing stresses on this shaft and thereby minimizing its size requirements.

The variable speed unit of the present invention is particularly adaptable for built-in uses where it is constructed as a part of the machine rather than as a self-contained unit such as the unit 10 of Figs. 1 to 4. In Figs. 5 to 7 I have illustrated such an embodiment of the invention in a polishing or buffing lathe 100. This lathe 100 has a hollow column 101 adapted for floor mounting and providing a removable mounting for the horizontal tool-carrying shaft or spindle 102 in a conventional manner. The spindle 102 projects at opposite ends through bearing hubs 103 on one or both of said projecting ends. In the performance of polishing or buffing operations large power requirements are presented, and in addition, it is desirable, for best and most economical results, to provide for variable speeds in the tool spindle 102. To satisfy these requirements the present invention mounts a speed-varying pulley assembly within the column 101 between the tool spindle 102 and the shaft 104 of a drive motor 105 which is also mounted within the column.

In the present instance three power input V-belts 31 and three power output V-belts 32 are employed, the driving shaft 104 having a three-grooved solid pulley 106 fixed thereon and the spindle 102 having a similar three-grooved solid pulley 106 fixed thereon within the column. Between and parallel to the shafts 102 and 104 a speed varying unit 110 is mounted, this unit being constructed as shown in Figs. 3 and 4, with the exception that three pulleys A and three pulleys B are provided. Thus this unit 110 has seven disks, three of which are fixed together to form the sliding unit, and the other four of which are fixed longitudinally of the central shaft. The unit 110 has its pulley assembly mounted on the pantograph mounting of Figs. 3 and 4 with the rocking base 85 mounted on a bracket 111 secured to the inside of the front wall of the column 101. To vary the position of the pulley assembly 110 the rocking base 85 has a projecting arm 112 which at its outer end carries a pivotally mounted nut 113. This nut 113 is engaged by a rotatable screw shaft 114 which extends through a rocking member 115 in the front wall of the column. The shaft 114 is fixed against longitudinal displacement relative to the rocking member, and carries an actuating wheel 116 on its projecting end. Thus by actuation of the wheel 116 the speed of the tool spindle 102 may be varied.

To tighten the belts 31 and 32, the motor 105 is shiftably mounted on the bottom of the column 101, there being an actuating screw 117 threaded through an upstanding fixed nut 118 on the bottom of the column to engage the motor base and force the motor along its path of adjustment. This path is determined by mounting bolts 119 projecting through slots in the motor base flanges, and the motor is clamped in adjusted position by tightening nuts 120 on the bolts 119.

From the foregoing description it will be evident that the present invention provides a multiple V-belt variable speed mechanism which is simple and rugged in construction and effective in its operation. This mechanism is particularly applicable to the production of large capacity variable speed drives within a small space, as for example, within the column or base of a machine.

I claim as my invention:

1. In a variable speed mechanism, a speed varying unit comprising a mounting shaft, a plurality of disks having central mounting bores and arranged on said shaft, the end ones of said disks having their adjacent faces formed with coned faces on their outer annular portion thereof and being annularly counter bored on said adjacent faces to provide an annular clearance space inwardly of said coned outer annular portion, said outer annular portion having a plurality of radial sectors cut out at equally spaced points and extending outwardly partially to the periphery of the disks to provide a plurality of clearance spaces separated by radial portions of said coned surfaces, and the intermediate disks having both side faces formed to correspond with the adjacent faces of said end disks, one end disk and each alternate disk counting therefrom constituting a first unit, spacing sleeves surrounding said shaft and extending between and abutting adjacent disks of said first unit, means on opposite ends of said shaft clamping the disks of said first unit against their spacing sleeves, said sleeves extending through the central bores of the other disks and said other disks constituting a second unit the disks of which are slidable with a snug sliding bearing longitudinally along said sleeves, and means including at least three spacing sleeves and bores circumferentially spaced fixing the disks of said second unit in predetermined longitudinally spaced and rigid relation to each other.

2. In a variable speed mechanism, a speed varying unit comprising a mounting shaft, a plurality of disks having central mounting bores and arranged on said shaft, the end ones of said disks having their adjacent faces formed with coned faces on their outer annular portion thereof and being annularly counter bored on said adjacent faces to provide an annular clearance space inwardly of said coned outer annular portion, said outer annular portion having a plurality of radial sectors cut out at equally spaced points and extending outwardly partially to the periphery of the disks to provide a plurality of clearance spaces separated by radial portions of said coned surfaces, and the intermediate disks having both side faces formed to correspond with the adjacent coned faces and counter-bores of said end disks, one end disk and each alternate disk counting therefrom constituting a first unit, spacing sleeves surrounding said shaft and extending between and engaging the counter-bored surfaces of adjacent disks of said first unit, means on opposite ends of said shaft clamping the disks of said first unit rigidly against their spacing sleeves, said sleeves extending with a relatively snug sliding fit through the central bores of the other disks and said other disks constituting a second unit the disks of which are slidable longitudinally along said sleeves, and means including a plurality of peripherally spaced spacing tubes extending loosely through clearance bores, through the intervening annular clearance spaces radially inwardly of the coned surfaces and abutting the ends of the counter bores of the disks of said second unit, and bolts extending through said spacing tubes and clamping the disks of said second unit in rigid relation to the ends of said spacing tubes.

3. In a variable speed mechanism of the V-belt type, a speed varying assembly comprising a mounting shaft, a plurality of centrally bored disks, adapted to be arranged in a predetermined axially alined relation and including two end disks, said end disks each having a single coned face on an outer annular portion thereof and the other disks having double coned faces on their opposite sides in corresponding outer annular portions, and all of said disks having annular mounting portions inwardly of their coned faces, said annular mounting portions being of a thickness, axially of the disks, which does not exceed the thickness of the disk in the other or coned portion thereof, there being an odd number of said disks and one end disk and each alternate disk counting therefrom constituting a first unit, and the other disk constituting a second unit, the disks of said first unit having a snug fit on said shaft, spacing sleeves snugly fitting on said shaft and extending between and abutting the mounting portions of the disks of said first unit, abutment means secured on opposite ends of said shaft and abutting the outer faces of the mounting portions of said end disks to clamp said shaft, the disks of said first unit, and said spacing sleeves together in a rigid first unit, the disks of said second unit being mounted one on each of said sleeves with their central bores having a snug sliding fit on said sleeves, and means for securing the disks of said second unit in a rigid assembly wherein each disk of the second unit provides bearing surfaces acting to maintain the desired non-wobbling relation of all of the disks of the second unit with respect to the axis of said shaft, said means comprising at least three spacing tubes disposed in circumferentially spaced relation and extending between and abutting the mounting portions of the disks of said second unit, each spacing tube as it extends between two disks of the second unit projecting through an individual clearance bore in the mounting portion of the intervening disk of the first unit, and bolts extending through said spacing tubes and clamping the disks of said second unit rigidly together against the ends of said spacing tubes, said bolts being located entirely within the space defined by the most remote end faces of said second unit.

ANDREW BENSON.